(12) United States Patent
Takemura

(10) Patent No.: US 6,243,591 B1
(45) Date of Patent: Jun. 5, 2001

(54) MOBILE COMMUNICATION SYSTEM

(75) Inventor: Narihira Takemura, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/940,293

(22) Filed: Sep. 30, 1997

(30) Foreign Application Priority Data

Oct. 8, 1996 (JP) .................................................. 8-267434

(51) Int. Cl.⁷ .................................................. H04B 7/00
(52) U.S. Cl. .................................................. 455/522; 455/69
(58) Field of Search ............................... 455/69, 522, 70, 455/67.1, 68, 88, 115, 127, 226.1, 226.2

(56) References Cited

U.S. PATENT DOCUMENTS

| | | | |
|---|---|---|---|
| 5,386,588 | * | 1/1995 | Yasuda .................................... 455/69 |
| 5,574,982 | * | 11/1996 | Almgren et al. ...................... 455/67.1 |
| 5,794,129 | * | 8/1998 | Komatsu ................................ 455/69 |
| 5,839,056 | * | 11/1998 | Hakkinen .............................. 455/69 |
| 5,857,155 | * | 1/1999 | Hill et al. .............................. 455/522 |
| 5,859,839 | * | 1/1999 | Ahlenius et al. ...................... 455/69 |
| 5,862,453 | * | 1/1999 | Love et al. ............................. 455/69 |
| 5,881,368 | * | 3/1999 | Grob et al. ............................. 455/69 |
| 5,884,187 | * | 3/1999 | Ziv et al. ............................... 455/522 |
| 5,887,245 | * | 3/1999 | Lindroth et al. ...................... 455/522 |
| 5,893,035 | * | 4/1999 | Chen ..................................... 455/522 |
| 5,898,925 | * | 4/1999 | Honkasalo et al. ................... 455/69 |
| 5,924,043 | * | 7/1999 | Takano ................................. 455/69 |
| 5,940,743 | * | 8/1999 | Sunay et al. .......................... 455/69 |
| 5,943,610 | * | 8/1999 | Endo ..................................... 455/69 |

FOREIGN PATENT DOCUMENTS

| | | |
|---|---|---|
| 5-103060 | 4/1993 | (JP) . |
| 7-336291 | 12/1995 | (JP) . |
| 8-139669 | 5/1996 | (JP) . |

* cited by examiner

*Primary Examiner*—Marsha D. Banks-Harold
(74) *Attorney, Agent, or Firm*—Scully, Scott, Murphy & Presser

(57) ABSTRACT

A mobile communication system includes a base station and a mobile station. The base station transmits base station information containing transmission power information. The mobile station can control the transmission power thereof in accordance with the transmission power information in the received base station information and a reception electric field strength.

7 Claims, 5 Drawing Sheets

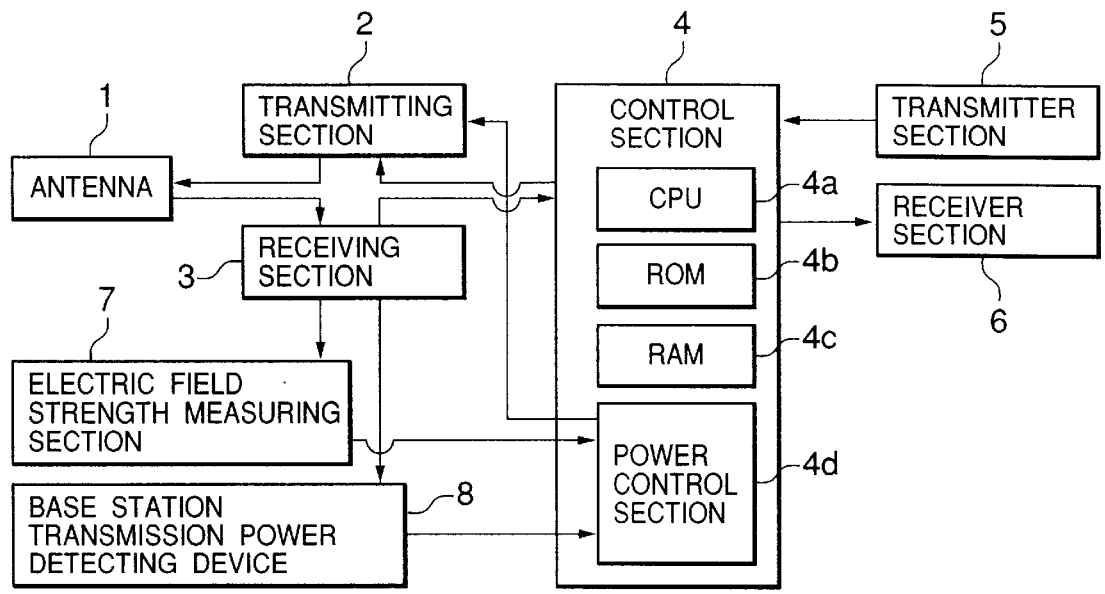
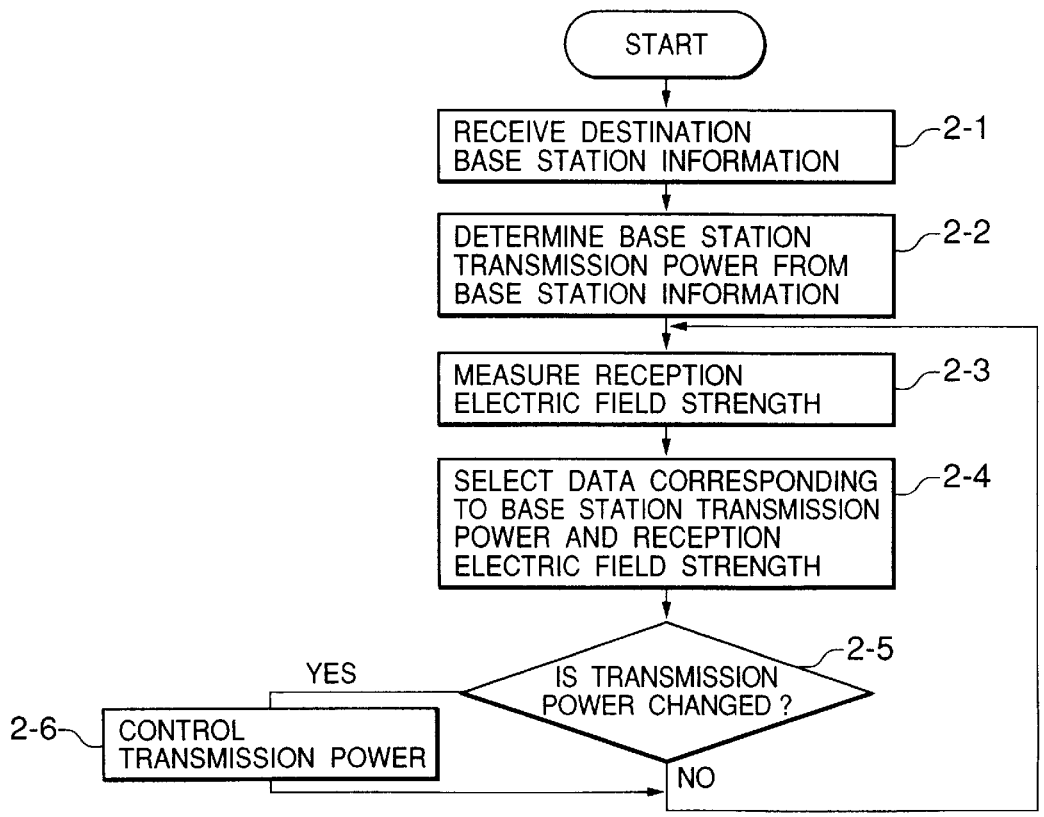

FIG.5A

|  | LOW-TRANSMISSION-POWER BASE STATION (ID =A***) | INTERMEDIATE-TRANSMISSION-POWER BASE STATION (ID =B***) | HIGH-TRANSMISSION-POWER BASE STATION (ID =C***) |
|---|---|---|---|
| RECEPTION ELECTRIC FIELD STRENGTH a OR MORE | TRANSMISSION POWER A-5 | TRANSMISSION POWER B-5 | TRANSMISSION POWER C-5 |
| RECEPTION ELECTRIC FIELD STRENGTH b OR MORE | TRANSMISSION POWER A-4 | TRANSMISSION POWER B-4 | TRANSMISSION POWER C-4 |
| RECEPTION ELECTRIC FIELD STRENGTH c OR MORE | TRANSMISSION POWER A-3 | TRANSMISSION POWER B-3 | TRANSMISSION POWER C-3 |
| RECEPTION ELECTRIC FIELD STRENGTH d OR MORE | TRANSMISSION POWER A-2 | TRANSMISSION POWER B-2 | TRANSMISSION POWER C-2 |
| RECEPTION ELECTRIC FIELD STRENGTH e OR MORE | TRANSMISSION POWER A-1 | TRANSMISSION POWER B-1 | TRANSMISSION POWER C-1 |

FIG.5B

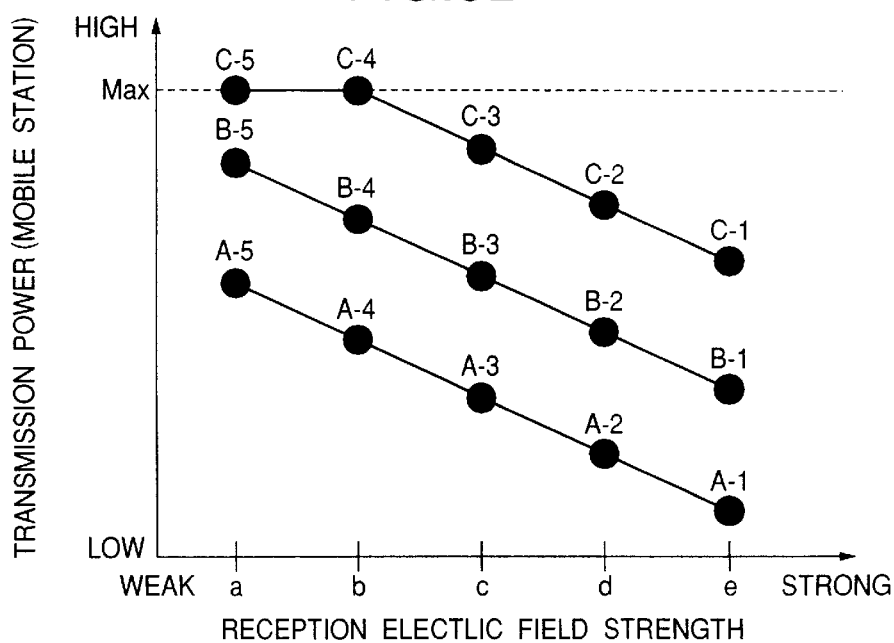

MOBILE COMMUNICATION SYSTEM

BACKGROUND OF THE INVENTION

1. Field of the Invention

The present invention relates to a mobile communication system such as a second-generation cordless telephone system and, more particularly, to control the transmission power on the mobile station side.

2. Description of the Prior Art

Second-generation cordless telephones (PHS) have been widely used as mobile telephones. In a system using such telephones, one service area is divided into a plurality of zones (see FIG. 2A), and a base station is installed in each zone. A base station and a mobile telephone (to be referred to as a mobile station hereinafter) are connected to each other by radio. When a conventional mobile station is near a base station, speech communication can be performed with a small transmission power. When, however, the mobile station is far from the base station, since speech communication cannot be performed with a small transmission power, the mobile station always transmits signals with a high power. Since the mobile station is driven by a battery, if transmission is always performed with a high power, the battery power is greatly consumed, and a long speech communication enable time cannot be obtained.

Under the circumstances, in the technique disclosed in Japanese Unexamined Patent Publication No. 7-336291, the reception electric field strength of a signal from a base station is measured on the mobile station side, and the transmission power is increased if the reception electric field strength decreases. With this technique, of battery power consumption is suppressed to prolong the service life of the battery.

In the invention disclosed in Japanese Unexamined Patent Publication No. 7-336291, when either the reception electric field strength or the bit error rate decreases, the transmission power is increased. An arrangement designed to control transmission power in accordance with a reception electric field strength will be described with reference to FIGS. 1A and 1B. FIG. 1A is a block diagram plainly showing the basic arrangement of a mobile station. FIG. 1B is a flow chart for explaining transmission power control.

This mobile station transmits/receives signals to/from a base station through an antenna 1. A received signal is sent to a control section 4 through a receiving section 3 to be subjected to communication control in a central processing unit (CPU) 4a, a read-only memory (ROM), and a random access memory (RAM) 4c. This signal is also sent to an electric field strength measuring section 7, in which the reception electric field strength of the signal is measured. In accordance with the control result obtained by the control section 4, a reception speech signal is sent to a receiver section 6, and a transmission speech signal is received through a transmitter section 5. The reception electric field strength measured by the electric field strength measuring section 7 is sent to the power control section 4d in the control section 4 to control the transmission power in a transmitting section 2.

Referring to the flow chart of FIG. 1B, the mobile station measures a reception electric field strength at predetermined time intervals (step 5-1). It is checked on the basis of the measurement result whether it is necessary to change the transmission power (step 5-2).

If it is determined that it is necessary to change the transmission power, the power control section 4d controls the transmission power to decrease the transmission power when the reception electric field strength is high, and to increase the transmission power when the reception electric field strength is low (step 5-3).

If it is determined in step 5-2 that the transmission power need not be changed, or the transmission power is controlled in step 5-3, the flow returns to step 5-1 to measure a reception electric field strength. Control on the transmission power is repeated in this manner.

That is, in the conventional transmission power control technique, the transmission power is controlled by determining the relative distance between a base station and a mobile station on the basis of the reception electric field strength. According to this control technique, as the relative distance between the base station and the mobile station decreases, the transmission power of the mobile station is decreased to prevent wasteful consumption of battery power as compared with a mobile station in which the transmission power is fixed. As a result, the operation time of the battery-driven mobile station can be prolonged.

Such a technique of reducing battery power consumption is effective when base stations (6-1) in zones (6-2) in a service area (6-3) are identical to each other, and the respective base stations (6-1) have the same transmission power, as shown in FIG. 2A. With the recent rapid increase in the number of mobile stations, base stations are in the urgent need of upgrading. The use of large-output base stations, which allow services with a small number of base stations, has been started. The following are the principal objects of the construction of a service area (6-10) using a plurality of base stations having different transmission powers, as shown in FIG. 2B.

The first object is to ensure a traffic in an area (6-4) which requires a high traffic. In practice, a large number of small-diameter zones in which base stations having a relatively small transmission power (to be referred to as low-transmission-power base stations (6-5)) are arranged in the area (6-4) to increase the density of base stations, thereby ensuring the traffic.

The second object is to upgrade base stations and broaden the overall service area by using a relatively small number of base stations to form the service area of an area (6-8) in which the density of mobile stations is low so the priority tends to be low in terms of upgrading of base stations, and a much high traffic is not required. In practice, a base station having a relatively high transmission power (to be referred to as a high-transmission-power base station (6-9) hereinafter) and forming a zone having a large radius is installed to decrease the number of base stations required to construct the service area, thereby upgrading base stations.

In an area (6-6) which requires an intermediate traffic, base stations having an intermediate transmission power (to be referred to as intermediate-transmission-power base stations (6-7) hereinafter) and forming a zone having a radius corresponding to the traffic are installed. In this manner, a plurality of types of base stations having different transmission powers are prepared to form the service area in consideration of the necessary traffics and the cost in base station upgrading. Current second-generation cordless telephone systems and the like form service areas by using a plurality of types of base stations having different transmission powers.

In such a state in which different transmission powers are set, the distance between a base station and a mobile station cannot be determined from a reception electric field strength, and hence the communication quality cannot be maintained by the conventional transmission power control technique.

As described above, the mobile station transmission power control method used in the conventional mobile communication system is based on the assumption that a uniform transmission power is set in the respective base stations. The relative distance between a mobile station and a base station is therefore determined on the basis of only a reception electric field strength in the mobile station. In a current mobile communication system, however, the service area is constituted by a plurality of types of base stations having different transmission powers. For this reason, the relative distance between a mobile station and a base station cannot be accurately calculated by the conventional mobile station transmission power control method. Speech communication is therefore disabled in some places.

Assume that a base station having a high transmission power is additionally installed in the conventional service area constituted by base stations having the same transmission power (to be referred to as standard base stations hereinafter) to broaden the service area. In this case, although the transmission power of a mobile station is properly controlled in the zone of a standard base station, the following problems are posed when the mobile station is located in the zone of the high-transmission-power base station.

Assume that a mobile station is at the same distance from the high-power-transmission base station as the distance at which the mobile station is far from a standard base station and an electromagnetic wave transmitted therefrom is weak so that the mobile station must perform transmission with the maximum transmission power. In such a place, the strength of the electric field received by the mobile station is larger than that received from the standard base station. For this reason, the mobile station determines that the electric field has a sufficiently high strength, and decreases the transmission power. The transmission performance of the mobile station, however, remains unchanged. If, therefore, the transmission power is decreased at the distance at which the standard base station can barely receive a signal transmitted with the maximum transmission power, even the high-transmission-power base station cannot receive the signal.

The above problem is based on the fact that the relative distance between a mobile station and a base station cannot be determined from a reception electric field strength alone. That is, the conventional mobile station transmission power control method is not effective in a service area in which base stations having different transmission powers are installed.

In general, each base station has a code for identifying itself as a base station ID, and transmits it to a mobile station. If, therefore, the base station IDs are identified to determine the transmission powers of the respective base stations on the mobile station side, and control is performed in accordance with the respective transmission powers, the above problem is solved. For this purpose, the mobile station must have information indicating the transmission powers corresponding to the respective base station IDs. This base station information is stored in the memory in the mobile station. A large memory capacity is, however, required to store all base station information in the memory. In addition, since the contents of the memory in the mobile station side cannot be updated, this method cannot cope with the installation of a new base station.

SUMMARY OF THE INVENTION

The present invention has been made in consideration of the above problems in the prior art, and has as its object to provide a mobile communication system which can properly control the transmission power of a mobile station even in a service area in which a plurality of types of base stations having different transmission powers are installed, and can cope with the installation of a new base station.

In order to achieve the above object, according to the first aspect of the present invention, there is provided a mobile communication system comprising a base station for transmitting base station information containing transmission power information, and a mobile station capable of controlling a transmission power thereof in accordance with the transmission power information in the received base station information and a reception electric field strength.

According to the second aspect of the present invention, the base station information containing transmission power information transmitted from the base station in the first aspect contains a code specifying the base station itself.

According to the third aspect of the present invention, the transmission power information in the second aspect is transmitted together with the code specifying the base station itself.

According to fourth aspect of the present invention, the mobile station in the first to third aspects holds array data from which a transmission power with which the mobile station is to perform transmission can be obtained on the basis of the reception electric field strength and the transmission power information.

According to the fifth aspect of the present invention, the mobile station in the first to third aspects holds a function capable of calculating a transmission power with which the mobile station is to perform transmission, on the basis of the reception electric field strength and the transmission power information, and determines the transmission power by performing a calculation using the function.

According to the sixth aspect of the present invention, there is provided a mobile communication system in which a mobile communication apparatus including an antenna, a transmitting section, a receiving section, an electric field strength measuring section for measuring an electric field strength of a reception signal, a transmitter section, a receiver section, and a control section for controlling operations of the respective sections can communicate with a predetermined one of a plurality of base stations in a communication service area having the base stations, the plurality of base stations transmitting pieces of base station information including transmission power values thereof with different transmission powers, and the mobile communication apparatus containing base station transmission power detecting means for detecting the transmission power value of a predetermined one of the base stations from the base station information contained in a reception signal from the base station, and a transmission power control section for controlling a mobile communication apparatus transmission power output from the transmitting section on the basis of the base station transmission power value detected by the base station transmission power detecting means and the electric field strength of the reception signal which is measured by the electric field strength measuring section.

According to the seventh aspect of the present invention, the transmission power control section of the mobile communication apparatus in the sixth aspect receives outputs from the electric field strength measuring section and the base station transmission power detecting means, and controls the transmitting section to ensure proper communication with the base station and perform transmission with a transmission power that minimizes power consumption in accordance with a transmission power value of the base station with which communication is currently performed, and a reception electric field strength which is currently received.

According to the eighth aspect of the present invention, the mobile communication apparatus in the sixth and seventh aspects includes an array data table from which a transmission power with which the mobile communication apparatus is to perform transmission with respect to the base station with which communication is currently performed can be obtained on the basis of the electric field strength of the reception signal, which is measured by the electric field strength measuring section, and the transmission power value transmitted from the base station.

According to the ninth aspect of the present invention, the mobile communication apparatus in the sixth and seventh aspects holds a function capable of calculating a transmission power with which the mobile communication apparatus is to perform transmission with respect to the base station with which communication is currently performed, on the basis of the electric field strength of the reception signal, which is measured by the electric field measuring section, and the transmission power value transmitted from the base station, and determines the transmission power of the mobile communication apparatus by performing a calculation using the function.

According to the 10th aspect of the present invention, there is provided a transmission power control method in a mobile communication apparatus, comprising the first step of receiving base station information transmitted from a base station and containing transmission power information of the base station, the second step of obtaining the transmission power of the base station from the transmission power information of the base station information, the third step of measuring a reception electric field strength of a signal transmitted from the base station, the fourth step of determining a transmission power with which transmission is to be performed with respect to the base station with which communication is currently performed on the basis of the transmission power value of the base station and the reception electric field strength, the fifth step of determining on the basis of the result obtained in the fourth step whether the transmission power used for current communication is to be changed, and the sixth step of changing the transmission power when it is determined as a result of the fifth step that the currently used transmission power is to be changed.

According to the 11th aspect of the present invention, the fourth step in the 10th aspect comprises using a table of array data corresponding to a transmission power with which transmission is to be performed, and determining the transmission power with which transmission is to be performed with respect to the base station with which communication is currently performed, on the basis of the transmission power value of the base station and the reception electric field strength.

According to the 12th aspect of the present invention, the fourth step in the 10th aspect comprises performing arithmetic processing of calculating a transmission power with which transmission is to be performed, and determining the transmission power with which transmission is to be performed with respect to the base station with which communication is currently performed, on the basis of the transmission power value of the base station and the reception electric field strength.

As is obvious from the above aspects, according to the present invention, even in the service area constituted by a plurality of types of base stations having different transmission powers, a mobile station can communicate with a base station With a proper transmission power in accordance with a reception electric field strength. That is, a transmission power value from the base station is contained in base station information from the base station and sent to the mobile station, and the transmission power value from the base station can be detected on the mobile station side. The mobile station can therefore detect the distance from the base station in accordance with the reception electric field strength, and can set a proper transmission power. Since the transmission power value from the mobile station can be properly controlled, the battery consumption of the mobile station can be reduced, and the operation time can be prolonged.

In addition, according to the present invention, transmission power values from the mobile station which are selected on the basis of reception electric field strengths in the mobile station and transmission power values from the base station are set in the mobile station as array data in the mobile station or a function of a reception electric field strength calculated in the mobile station and a transmission power value from the base station. Even if, therefore, the number of base stations constituting a service area increases, the mobile station can properly cope with this situation. The number of base stations in a service area can be arbitrarily changed, and hence the degree of freedom in installing new base stations is high.

If a transmission power value from the mobile station is set as a function, an arbitrary transmission power value can be set as a transmission power value from a base station. Transmission power values can therefore be arbitrarily set when base stations are additionally installed or changed in the service area. This advantage is considerably limited when transmission power values from the mobile station are set as array data. If, however, installation of a new base station and changing of some base station are known in advance, corresponding array data may be prepared to cope with such a situation.

In addition, since the mobile station has transmission power values as array data or a function, the amount of information held in the mobile station is small as compared with a case in which base station information of each base station is held. The memory capacity used in the mobile station can be reduced.

The above and many other objects, features and advantages of the present invention will become manifest to those skilled in the art upon making reference to the following detailed description and accompanying drawings in which preferred embodiments incorporating the principles of the present invention are shown by way of illustrative example.

BRIEF DESCRIPTION OF THE DRAWINGS

FIGS. 1A and 1B show a conventional mobile communication system, in which FIG. 1A is a block diagram showing the arrangement of a mobile station, and FIG. 1B is a flow chart showing a procedure for transmission power control;

FIGS. 2A and 2B show the arrangements of service areas in mobile communication systems, in which FIG. 2A is a view showing the service area constituted by a plurality of base stations having the same transmission power, and FIG. 2B is a view showing the service area constituted by a plurality of types of base stations having different transmission powers;

FIG. 3 is a block diagram showing the arrangement of a mobile station according to an embodiment of the present invention;

FIG. 4 is a flow chart showing a procedure in the embodiment of the present invention;

FIGS. 5A and 5B show the relationship between the reception electric field strengths that can be set in the embodiment of the present invention, the transmission power values of base stations, and the transmission power values from a mobile station, in which FIG. 5A is a table indicating array data, and FIG. 5B is a related graph based on a function.

DETAILED DESCRIPTION OF THE PREFERRED EMBODIMENT

Figure 1A:
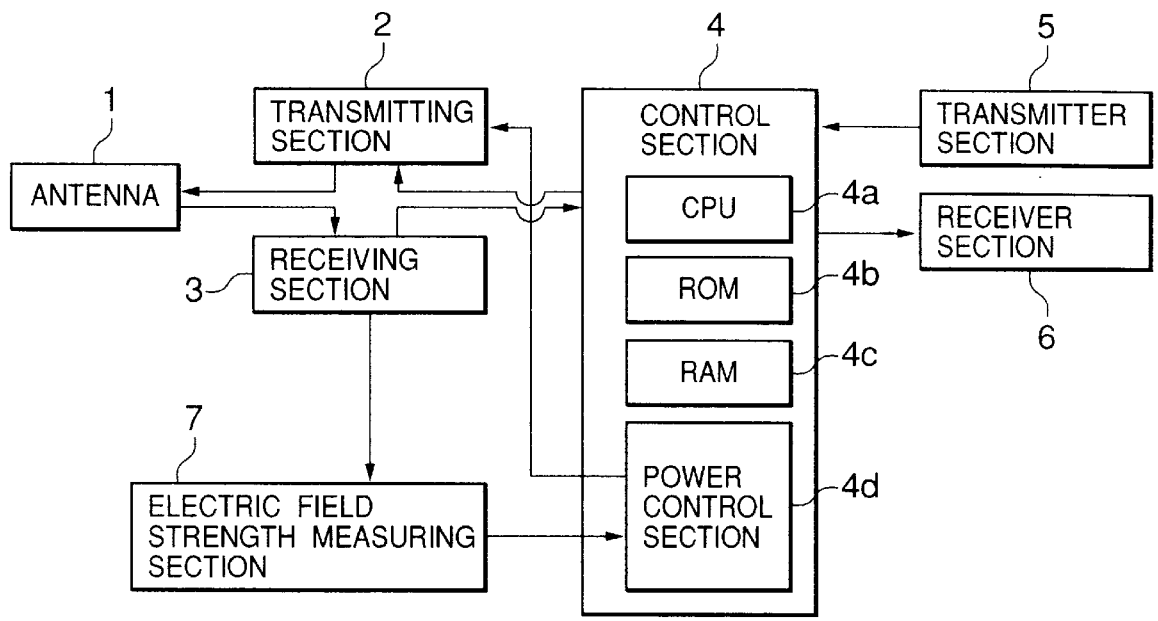
Figure 1B:
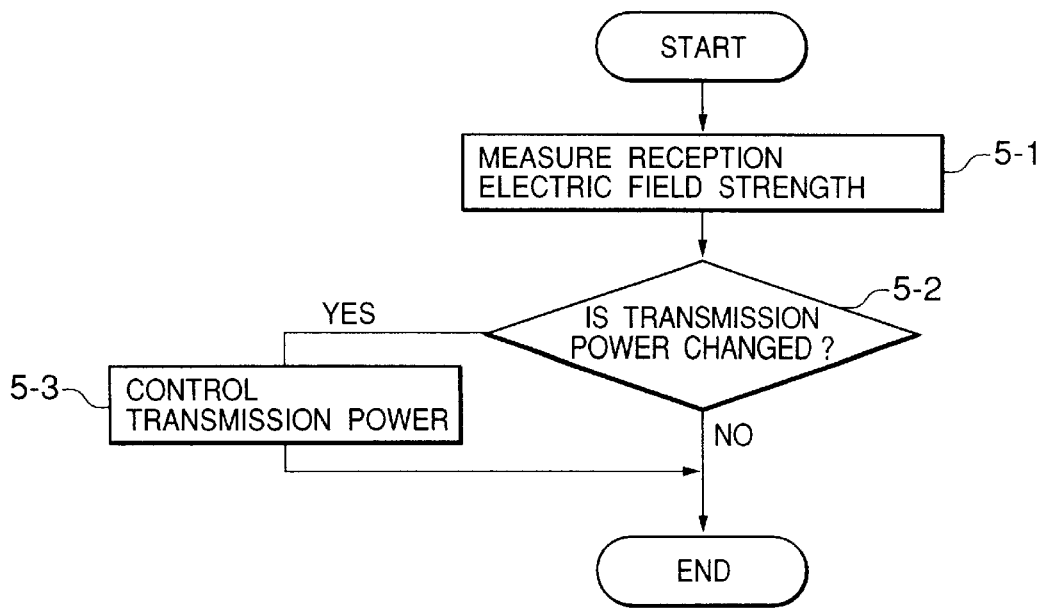
Figure 2A:
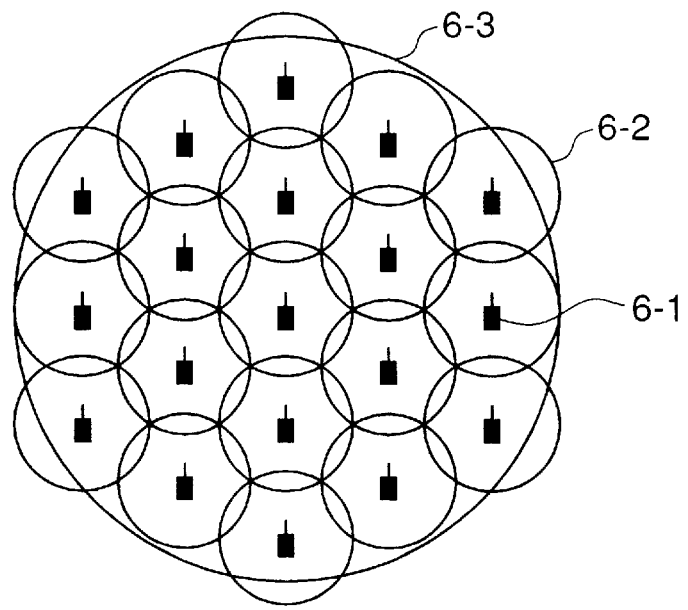
Figure 2B:
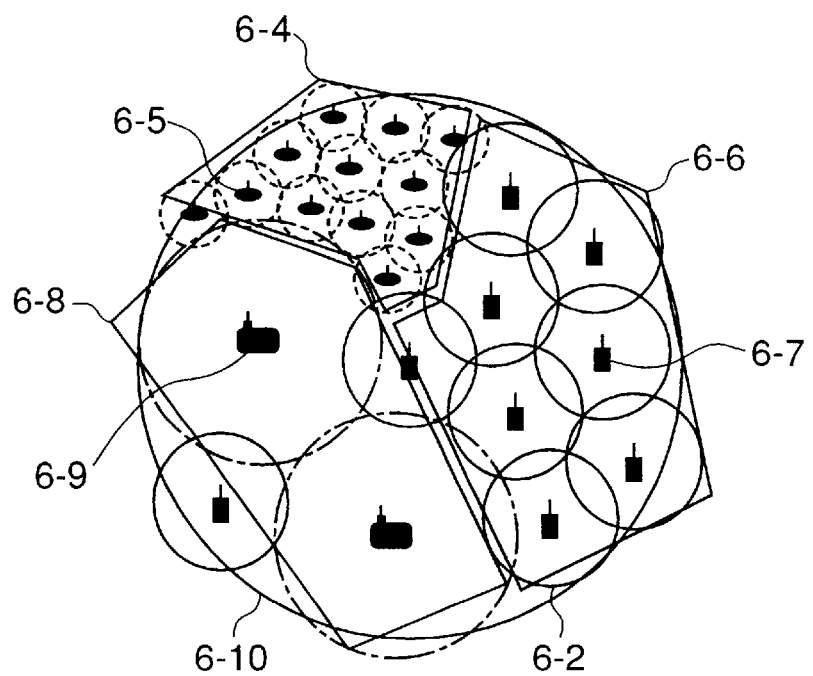

A preferred embodiment of the present invention will be described below with reference to the accompanying drawings.

FIG. 3 is a block diagram showing the basic arrangement of a mobile station according to the first embodiment of the present invention. The signal received from a base station through an antenna 1 is subjected to detection/demodulation processing in a receiving section 3. As a result, a control signal between the mobile station and the base station is extracted from the signal, together with a speech signal. The control signal is sent to a control section 4, in which a central processing unit (CPU) 4a, a read-only memory (ROM) 4b, and a random access memory (RAM) 4c perform control on transmission in a transmitter section 5 and reception in a receiver section 6 and control on transmission/reception with respect to the base station. The transmitter section 5 is constituted by a condenser microphone and the like. The receiver section 6 is constituted by a speaker and the like. The receiving section 3 sends the signal received from the base station to an electric field strength measuring section 7 to measure the reception electric field strength. The control signal received from the base station and demodulated by the receiving section 3 is sent to a base station transmission power detecting device 8, which reads the transmission power information sent from the base station. The electric field strength information from the electric field strength measuring section 7 and the transmission power information from the base station transmission power detecting device 8 are sent to a power control section 4d of the control section 4. The power control section 4d determines the power of a signal to be transmitted from the mobile station to the base station. The determined power information is sent to the transmitting section 2. The transmission signal contents sent from the control section 4 are transmitted from the antenna 1 with the power corresponding to the power information supplied from the power control section 4d.

Figure 6:
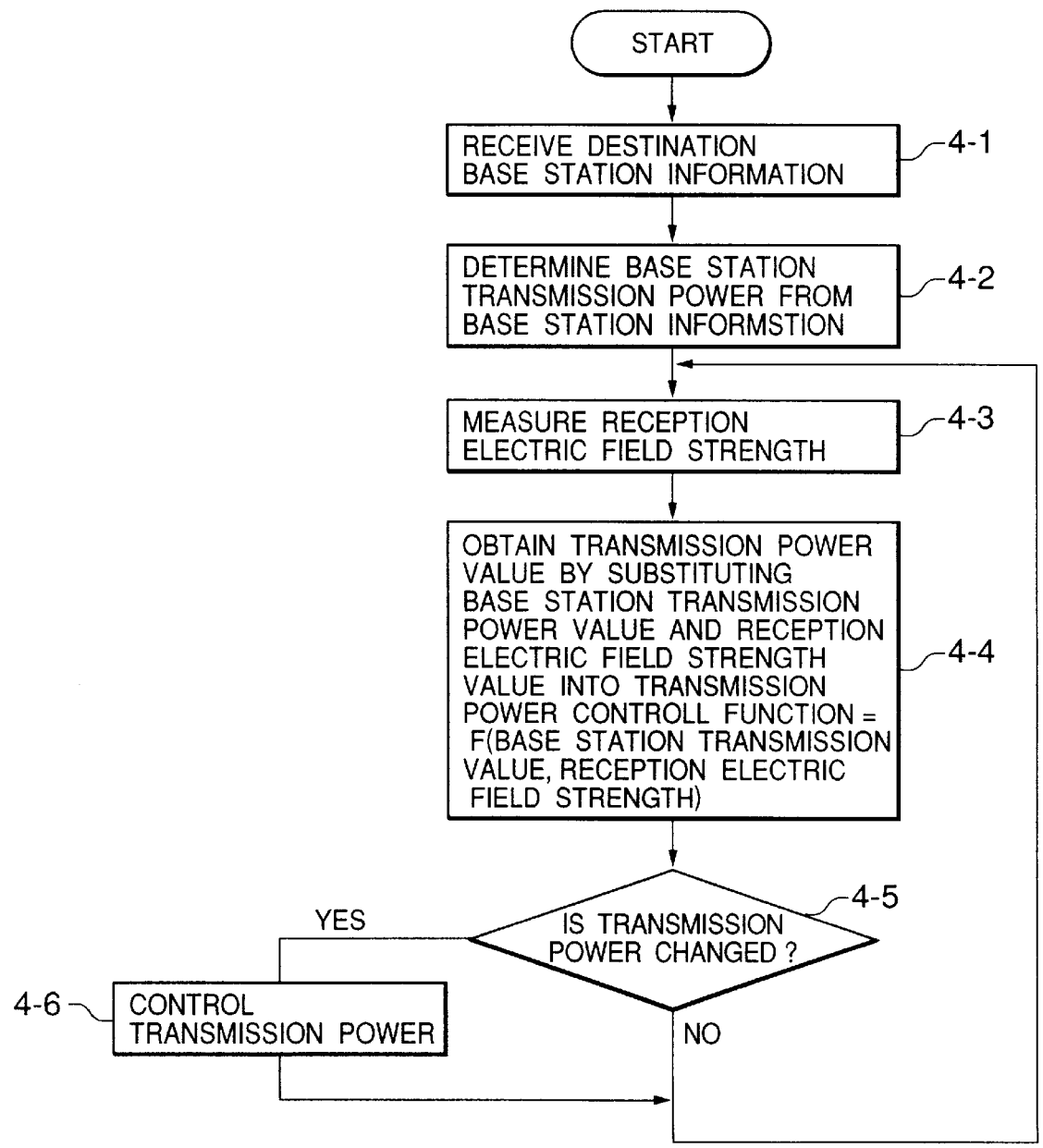
FIG. 6 is a flow chart showing another procedure in the embodiment of the present invention.

The transmitting section 2 can control the transmission power in accordance with the transmission power information from the power control section 4d by the following two methods. In the first method, transmission power values to be transmitted are prepared as a data array constituted by reception electric field strengths and base station transmission power. When a reception electric field strength and a base station transmission power are obtained, the corresponding transmission power value can be obtained from the data array. In the second method, each transmission power value to be transmitted is prepared as a function of a reception electric field strength and a base station transmission power. When a reception electric field strength and a base station transmission power are obtained, the corresponding transmission power to be set is obtained as a function of the reception electric field strength and the base station transmission power. FIG. 4 shows a procedure based on the first method. FIG. 6 shows a procedure based on the second method. These procedures will be described later.

The transmission power information to be sent from a base station is preferably encoded and transmitted after being added to the ID code of the base station. A method of transmitting transmission power information from a known station is not limited to this method, and transmission power information may be sent to a base station by another method.

FIG. 4 shows a procedure by which a mobile station obtains a transmission power from a data array constituted by reception electric field strengths and base station transmission powers. The mobile station extracts base station information from a control signal transmitted from a base station in the zone in which the mobile station exists (step 2-1). The base station information contains the base station ID, the transmission power of the base station, and the like. The mobile station determines the transmission power value of the base station from this base station information (step 2-2). Thereafter, the mobile station measures the reception electric field strength (step 2-3), and obtains the transmission power value to be transmitted, which corresponds to the reception electric field strength as the measurement result and the base station transmission power value obtained from the base station information, from the array data stored in the memory in the mobile station (step 2-4). As a result, the mobile station determines whether to change the transmission power (step 3-5).

If it is determined that the transmission power need be changed, the power control section (denoted by reference numeral 4d in FIG. 3) controls the transmission power in accordance with the information about the transmission power value to be transmitted (step 2-6). This transmission power control is performed in accordance with the transmission power of the base station such that the transmission power is decreased if the reception electric field strength is higher than a predetermined strength, and is increased if the reception electric field strength is lower than the predetermined strength. After the transmission power control, the flow returns to the step of measuring a reception electric field strength (step 2-3), thus repeating the above processing.

In contrast to this, if it is determined that the transmission power need not be changed, the next processing is performed, i.e., the flow returns to the step of measuring a reception electric field strength (step 2-3). Thereafter, the mobile station repeats the above processing, i.e., obtaining a transmission power value corresponding to a reception electric field strength and a base station transmission power (step 3-4), and determining whether the transmission power needs to be changed.

If the destination base station is manually changed, the procedure for transmission power control is repeated from the first step (start).

An example of the array data which is constituted by transmission power values to be transmitted, reception electric field strengths, and base station transmission power values and is stored in the memory of a mobile station will be described next with reference to FIGS. 5A and 5B. FIG. 5b shows a table indicating an example of the array data. FIG. 5B is a graph based on this array data.

Consider a service area in which a low-transmission-power base station (ID=A*), an intermediate-transmission-power base station (ID=B*), and a high-transmission-power base station (ID=C***) are installed as transmission base stations. The operation of this system remains unchanged regardless of the number of base stations with such transmission powers and the number of base stations additionally installed. Assume that five different reception electric field strengths, i.e., a or more, b or more, c or more, d or more, and e or more, and that satisfactory communication quality cannot be ensured with a reception electric field strength weaker than a.

For the low-transmission-power base station (ID=A*), transmission powers A-5, A-4, A-3, A-2, and A-1 are prepared in correspondence with the reception electric field strengths. For the intermediate-transmission-power base station (ID=B*), transmission powers B-5, B-4, B-3, B-2, and B-1 are prepared in correspondence with the reception electric field strengths. For the intermediate-transmission-power base station (ID=C***), transmission powers C-5, C-4, C-3, C-2, and C-1 are prepared in correspondence with the reception electric field strengths. The transmission power gradually decreases from "A-5" to "A-1"; from "B-5" to "B-1"; and from "C-5" to "C-1". "C-5" and "C-4" are the maximum transmission power values. With the same reception electric field strength, the transmission power C-5 (C-4) is the highest power, "B-5" is the next highest power, and "A-5" is the lowest power.

It is essential in such setting that the transmission power decreases as the reception electric field strength increases so as to reduce battery power consumption. To prevent a reception failure on the base station side when the mobile station decreases the transmission power, another setting must also be performed to inhibit the mobile station from decreasing the transmission power depending on the transmission power of the base station even if the reception electric field strength increases. The transmission power C-4 reflects this setting. In addition, the transmission power of the mobile station must be set so as not to exceed the maximum transmission power value defined in each mobile communication system.

This array data include the three types of base station transmission power values. However, various types of transmission power values may be set, as needed. In this case, transmission power data corresponding to the types of base stations in which transmission powers are set is prepared. Assume that a base station with a new transmission power is expected to be installed. In this case, if data about the base station with this transmission power is prepared, the data can be used for the system when the base station is additionally installed. Although the five types of reception electric field strengths are set in this embodiment, the number of types can be increased or decreased, as needed.

FIG. 6 is a flow chart showing a procedure in a mobile station which calculates the transmission power of the mobile station as a function of a reception electric field strength and a base station transmission power. The mobile station receives base station information transmitted from a base station in the zone in which the mobile station itself exists (step 4-1). The mobile station obtains the base station ID and transmission power information about the base station from the base station information (step 4-2). The mobile station then measures the reception electric field strength (step 4-3), and calculates the optimal transmission power value of the mobile station as a function F (base station transmission power, reception electric field strength) of the transmission power from the base station and the measured reception electric field strength (step 4-4). FIG. 5B is a graph based on this function. In accordance with the calculation result, the mobile unit determines whether the transmission power need be changed (step 4-5).

If it is determined that the transmission power need be changed, the transmitting section (denoted by reference numeral 2 in FIG. 3) is controlled to set the transmission power obtained by the functional calculation (step 4-6). After control on the transmitting section is complete, the flow returns to the step of measuring a reception electric field strength (step 4-3) to repeat the above processing.

If it is determined that the transmission power need not be changed, the flow returns to the step of measuring a reception electric field strength (step 4-3) to repeat the above processing.

If the destination base station is manually changed, the procedure for transmission power control is repeated from the first step (start).

What is claimed is:

1. A mobile communication system comprising:

a base station for transmitting base station information containing transmission power information on the power level with which the base station is transmitting signals to a mobile station, and a code specifying the particular base station itself;

a mobile station which controls its own transmission power in accordance with (i) the transmission power information in the received base station information on the power level with which the base station is transmitting signals to the mobile station, and (ii) a reception electric field strength of the signals received from the base station by the mobile station as measured by the mobile station;

wherein the mobile station stores an array of data comprised of (i) a plurality of base station transmission power levels and (ii) a plurality of reception electric field strengths for each of the plurality of base station transmission power levels, and wherein a particular base station transmission power level and a particular reception electric field strength indicate a particular mobile station transmission power level, from which a selected transmission power with which the mobile station is to perform transmission is selected from the array of data on the basis of (i) the transmission power information received from the base station, and (ii) the reception electric field strength measured by the mobile station; and the mobile station performs a transmission to the base station at said selected transmission power.

2. A mobile communication system comprising:

a base station for transmitting base station information containing transmission power information on the power level with which the base station is transmitting signals to a mobile station, and a code specifying the particular base station itself, and a mobile station which controls its own transmission power in accordance with (i) the transmission power information in the received base station information on the power level with which the base station is transmitting signals to the mobile station, and (ii) a reception electric field strength of the signals received from the base station by the mobile station as measured by the mobile station, wherein the mobile station stores an array of data comprised of (i) a plurality of base station transmission power levels and (ii) a plurality of reception electric field strengths for each of the plurality of base station transmission power levels, and wherein a particular base station transmission power level and a particular reception electric field strength indicate a particular mobile station transmission power level, wherein the mobile station stores a function for calculating a transmission power with which the mobile station is to perform transmission on the basis of (i) the transmission power information received from the base station, and (ii) the reception electric field strength measured by the mobile station and determines a calculated transmission power by performing a calculation using the stored function; and the mobile station performs a transmission to the base station at said calculated transmission power.

3. A mobile communication system comprising:

a mobile communication station including an antenna, a transmitting section, a receiving section, an electric field strength measuring section for measuring an electric field strength of a reception signal from a base station, and a control section for controlling operations of the respective sections to communicate with a predetermined one of a plurality of base stations in a communication service area having the plurality of base stations;

each of the pluralitiy of base stations transmits base station information containing a transmission power value on the power level with which the base station is transmitting signals to the mobile station;

the mobile communication station including, (a) base station transmission power detecting means for detecting the transmission power value of a predetermined one of the base stations from the base station information contained in a reception signal from the base station on the power level with which the base station is transmitting signals to the mobile station, (b) a transmission power control section for controlling the mobile communication station transmission power output from said transmitting section on the basis of, (i) the base station transmission power value transmitted by the base station and detected by the base station transmission power detecting means, and (ii) the electric field strength of the reception signal measured by said electric field strength measuring section of the mobile communication station, wherein the mobile communication station stores an array of data table comprised of (i) a plurality of base station transmission power levels and (ii) a plurality of reception electric field strengths for each of the plurality of base station transmission power levels, and wherein a particular base station transmission power level and a particular reception electric field strength indicate a particular mobile station transmission power level with which the mobile communication station is to perform transmission to the base station with which communication is currently performed.

4. A system according to claim 3, wherein said transmission power control section of the mobile communication station receives outputs from (i) said base station transmission power detection means and (ii) said electric field strength measuring section, and controls said transmitting section to ensure proper communication with the base station and perform transmission with a transmission power which minimizes power consumption in accordance with (i) the transmission power value of the base station with which communication is currently being performed and (ii) the reception electric field strength which is currently measured.

5. A system according to claim 3, wherein the mobile communication station stores a function for calculating a transmission power with which the mobile communication station is to perform transmission with respect to the base station with which communication is currently being performed, on the basis of (i) the transmission power value transmitted from said base station, and (ii) the electric field strength of the reception signal which is measured by said electric field measuring section, and determines a calculated transmission power for the mobile communication station by performing a calculation using the stored function.

6. A transmission power control method for a mobile communication station comprising:

a first step of receiving base station information transmitted from a base station and containing transmission power information on the transmission power value with which the base station is transmitting signals to a mobile station, a second step of obtaining the transmission power value of the base station from the transmission power information of the base station information, a third step of measuring a reception electric field strength at the mobile station of a signal transmitted from the base station, a fourth step of determining a transmission power with which transmission by the mobile station is to be performed with respect to the base station with which communication is currently being performed on the basis of (i) the transmission power value of the base station, and (ii) the reception electric field strength, using a table of array data comprised of (i) a plurality of base station transmission power levels and (ii) a plurality of reception electric field strengths for each of the plurality of base station transmission power levels, and wherein a particular base station transmission power level and a particular reception electric field strength indicate a particular mobile station transmission power level with which transmission is to be performed, a fifth step of determining on the basis of the result obtained in the fourth step whether the transmission power used by the mobile station for the current transmission is to be changed, and a sixth step of changing the transmission power used by the mobile station when it is determined as a result of the fifth step that the currently used transmission power is to be changed.

7. A method according to claim 6, wherein:

the mobile station stores a function for calculating a transmission power with which the mobile station is to perform transmission on the basis of (i) the transmission power information received from the base station, and (ii) the reception electric field strength measured by the mobile station, and determines a calculated transmission power by performing a calculation using the stored function; and the mobile station performs a transmission to the base station at said calculated transmission power.

* * * * *